United States Patent
Milbrath et al.

(10) Patent No.: US 6,435,132 B1
(45) Date of Patent: Aug. 20, 2002

(54) TEAT CUP ASSEMBLY

(76) Inventors: Constance J. Milbrath, N7293 County Hwy. Y; Reed A. Larson, N. 7766 State Rd. 26, both of Watertown, WI (US) 53094

( * ) Notice: Subject to any disclaimer, the term of this patent is extended or adjusted under 35 U.S.C. 154(b) by 0 days.

(21) Appl. No.: 09/471,828

(22) Filed: Dec. 23, 1999

(51) Int. Cl.⁷ .................................................. A01J 5/04
(52) U.S. Cl. ................................................. 119/14.47
(58) Field of Search ........................... 119/14.47, 14.48, 119/14.49, 14.5, 14.51, 14.52, 14.53

(56) References Cited

U.S. PATENT DOCUMENTS

| | | | | |
|---|---|---|---|---|
| 1,270,308 A | * | 6/1918 | Mcleod | 119/14.47 |
| 1,430,191 A | * | 9/1922 | Rutherform | 119/14.47 |
| 2,997,980 A | * | 8/1961 | Noorlander | 119/14.47 |
| 3,096,740 A | | 7/1963 | Noorlander | 119/14.52 |
| 3,967,587 A | | 7/1976 | Noorlander | 119/14.49 |
| 3,973,521 A | | 8/1976 | Duncan | 119/14.47 |
| 4,059,070 A | | 11/1977 | Siddall et al. | 119/14.47 |
| 4,090,471 A | | 5/1978 | Thompson | 119/14.51 |
| 4,116,165 A | | 9/1978 | Arrington | 119/14.47 |
| 4,249,481 A | | 2/1981 | Adams | 119/14.02 |
| 4,263,912 A | | 4/1981 | Adams | 128/281 |
| 4,269,143 A | | 5/1981 | Erbach | 119/14.49 |
| 4,280,446 A | | 7/1981 | Noorlander | 119/14.49 |
| 4,303,038 A | | 12/1981 | Thompson et al. | 119/14.36 |
| 4,315,480 A | | 2/1982 | Noorlander | 119/14.49 |
| 4,324,201 A | | 4/1982 | Larson | 119/14.51 |
| 4,332,215 A | | 6/1982 | Larson | 119/14.49 |
| 4,352,234 A | | 10/1982 | Noorlander | 29/450 |
| 4,425,872 A | | 1/1984 | Mills | 119/14.47 |
| 4,457,262 A | | 7/1984 | Mills | 119/14.47 |
| 4,459,938 A | | 7/1984 | Noorlander | 119/14.49 |
| 4,459,939 A | | 7/1984 | Noorlander | 119/14.49 |
| 4,530,307 A | | 7/1985 | Thompson | 119/14.49 |
| 4,572,106 A | | 2/1986 | Mills | 119/14.47 |
| 4,604,969 A | | 8/1986 | Larson | 119/14.36 |
| 4,610,220 A | | 9/1986 | Goldberg et al. | 119/14.47 |
| 4,651,676 A | | 3/1987 | Kupres | 119/14.47 |
| 4,745,881 A | | 5/1988 | Larson | 119/14.51 |
| 4,756,275 A | | 7/1988 | Larson | 119/14.49 |
| 4,869,205 A | | 9/1989 | Larson | 119/14.51 |
| 4,964,368 A | | 10/1990 | Ball et al. | 119/14.49 |
| 5,007,378 A | | 4/1991 | Larson | 119/14.47 |
| 5,069,162 A | | 12/1991 | Thompson et al. | 119/14.47 |
| 5,178,095 A | | 1/1993 | Mein | 119/14.47 |
| 5,224,442 A | | 7/1993 | Davies | 119/14.49 |
| 5,482,004 A | | 1/1996 | Chowdhury | 119/14.52 |
| 5,493,995 A | | 2/1996 | Chowdhury | 119/14.54 |
| 5,572,947 A | | 11/1996 | Larson et al. | 119/14.51 |
| 5,752,462 A | | 5/1998 | Petersson | 119/14.47 |

FOREIGN PATENT DOCUMENTS

| | | | | |
|---|---|---|---|---|
| SU | 1066172 | * | 12/1983 | 119/14.47 |
| SU | 1276311 | * | 12/1986 | 119/14.47 |

* cited by examiner

*Primary Examiner*—Thomas Price
(74) *Attorney, Agent, or Firm*—Andrus, Sceales, Starke & Sawall, LLP

(57) ABSTRACT

A teat cup assembly for use with a milking machine for milking cows. The teat cup assembly comprises a hollow tubular shell together with an inflation including a hollow tubular barrel disposed within the shell. The inflation is deformable between a relaxed profile and a collapsed massage profile around the teat of a cow. The teat cup assembly includes reinforcing structure for predetermining a desired collapsed massage profile for the barrel of the inflation. The reinforcing structure includes a plurality of circumferentially spaced ribs projecting from the barrel of the inflation, and a corresponding plurality of rib receiving grooves formed in the inner surface of the shell. As a result, the inflation will always collapse in a known and predetermined massage profile, which is preferably triangular in shape, to override any inherent inconsistencies in manufacturing processes or materials of construction.

19 Claims, 2 Drawing Sheets

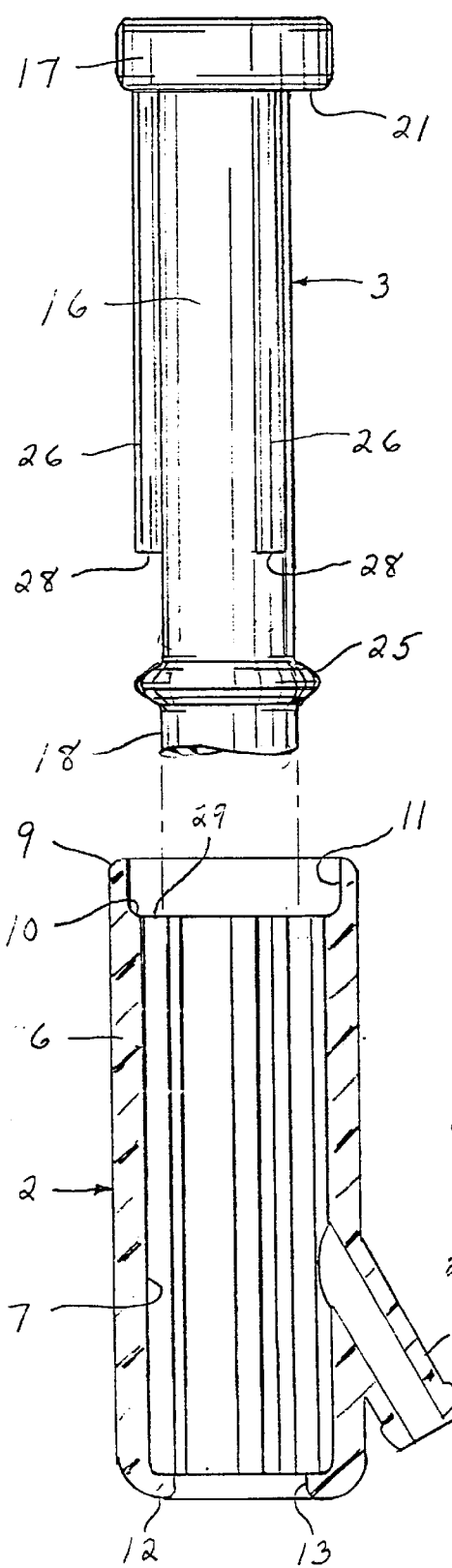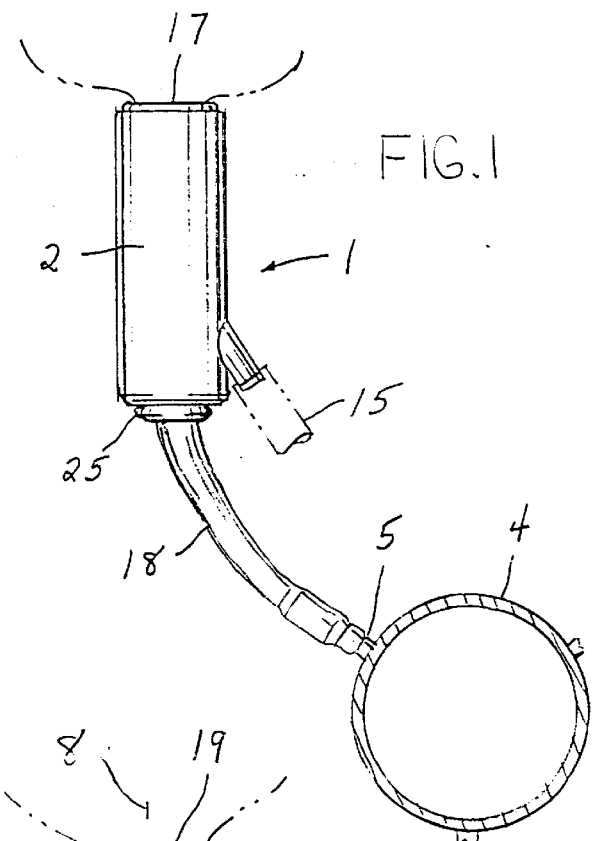

TEAT CUP ASSEMBLY

BACKGROUND OF THE INVENTION

The present invention relates to teat cup assemblies for vacuum operated milking machines, and more particularly to an inflation for use in a teat cup assembly having a predetermined collapsed massage profile.

Conventional automatic milking machines utilize teat cup assemblies for milking cows. A typical teat cup assembly includes a hollow, rigid outer shell or cup adapted to be attached to a pulsating vacuum line, and an elongated, flexible, resilient, tubular inflation which fits inside the shell and is coupled with a constant vacuum source. Typically, the inflation includes an upper mouth, a barrel defining a teat receiving region, and a milk tube section which extends downwardly out of the shell or cup and is attached to a milk claw for collecting milk. The upper mouth as well as the milk tube section are both sealingly engaged with the upper and lower ends of the shell, respectively, to form an annular vacuum chamber surrounding the barrel between the shell and the inflation. As previously noted, since the shell is attached to a pulsating vacuum line, the pressure in this annular chamber is alternated between subatmospheric pressure and atmospheric pressure. The constant vacuum applied to the lower milking tube section of the inflation draws milk from the cow's teat while at the same time the alternating pressure in the annular chamber periodically causes inward collapse of the barrel wall of the inflation or liner resulting in a massaging action on the teat. Also, the periodic collapse of the barrel intermittently relieves the teat from exposure to the constant vacuum applied to the interior of the inflation, and thus advantageously avoids complications such as inflammation of the teat as well as a tendency to induce mastitis.

Inflations are typically composed of elastomeric materials due to the resilient nature of such materials, i.e. their capability of recovering to their original size and shape after repeated deformation. Inflations are most often made from a natural or synthetic rubber composition, e.g. silicone rubbers have been proposed and used in certain circumstances. Each of these materials have their own unique advantages and disadvantages. For example, natural or synthetic rubber compositions are more resistant to tearing or ripping, but are subject to attack by oils, butterfats, teat treatment preparations and other chemicals used in the milking process. On the other hand, silicone rubbers are substantially less vulnerable to attack by such chemicals, and thus, have relatively long useful life. However, silicone rubber tends to tear and puncture more easily than rubber.

It is also known that due to manufacturing tolerances and as a result of different manufacturing techniques, inflations composed of the same material do not always have identical collapsed massage profiles. In other words, the dynamics of an inflation used in one teat cup assembly may be significantly different from what appears to be an identical inflation used in another teat cup assembly. Thus, it would be an advantage in the art to provide a teat cup assembly which utilizes an inflation having a predetermined and desired massage profile. Such an assembly would override any inherent manufacturing tolerances and/or defects from one inflation to the next.

SUMMARY OF THE INVENTION

A teat cup assembly for use with a milking machine for milking cows. The teat cup assembly comprises a shell including a hollow tubular body having an outer wall together with an inflation including a hollow tubular barrel disposed within the tubular body of the shell. The barrel defines a teat receiving region and has an outer wall spaced inwardly from the outer wall of the shell to define a vacuum chamber. The inflation is deformable between a relaxed profile and a collapsed massage profile around the teat of a cow. The teat cup assembly includes reinforcing means for predetermining a desired collapsed massage profile for the barrel of the inflation. The reinforcing means comprises at least one elongated, axially extending interconnection between the barrel and the shell. This interconnection may be either a mechanical interconnection or a chemical bond between the barrel and the shell. Preferably, the reinforcing means is a mechanical interconnection comprising at least one rib projecting either inwardly from the outer wall of the shell or outwardly from the outer wall of the barrel, together with at least one corresponding elongated, axially extending, mating rib-receiving groove formed in the other of either the outer wall of the shell or the outer wall of the barrel. Preferably, there are a plurality of circumferentially spaced ribs projecting from the barrel of the inflation, and there are a corresponding plurality of rib-receiving grooves formed in the inner surface of the outer wall of the shell. Most preferably, there are three equiangularly spaced apart ribs and three corresponding grooves, but depending upon the cows being milked, the number of ribs and grooves may be as few as one and as many as four.

In a preferred form of the teat cup assembly, the shell includes an upper end having an axially extending rim defining an annular recess and a lower end having a radially extending rim defining an opening of reduced diameter. The inflation includes a head portion dimensioned to fit within the annular recess, and a milking tube section extending through the opening in the lower end of the shell. An upper seal between the head portion of the inflation and the upper end of the tubular body of the shell is preferably formed by an expandable ring disposed within the head portion of the inflation which urges the head portion radially outwardly against the axially extending rim of the shell. A lower seal between the milking tube section of the inflation and the lower end of the tubular body of the shell is preferably formed by a radially extending, integral, annular, external flange projecting from the milking tube section which abuts against the radially extending rim of the shell.

The present invention thus provides a teat cup assembly wherein the inflation and shell have been modified to provide reinforcing means for predetermining a desired massage profile for the barrel of the inflation when collapsed. This massage profile is preferably triangular in shape, and thus overrides any inherent inconsistencies in manufacturing processes and/or materials of construction. Thus, the inflation will always collapse in a known or predetermined massage profile.

BRIEF DESCRIPTION OF THE SEVERAL VIEWS OF THE DRAWING

In the drawings:

FIG. 1 is a side elevational view of a teat cup assembly, partially in section, of the present invention shown connected at its upper end to a cow's teat and at its lower end to a claw of a milking machine;

FIG. 2 is an exploded view of the teat cup assembly of the invention showing a portion of the inflation as well as the shell in cross section;

FIG. 3 is an enlarged, cross-sectional view of the teat cup assembly illustrated in FIG. 1;

DETAILED DESCRIPTION OF THE PREFERRED EMBODIMENTS

Figure 4:
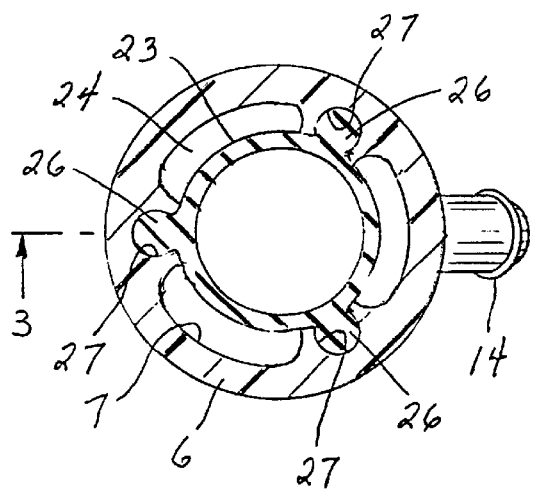
FIG. 4 is a sectional view taken along line 4—4 of FIG. 3 and illustrating the barrel of the inflation in a relaxed profile.

Referring now to the drawings, there is illustrated a teat cup assembly generally designated by the numeral 1. Teat assembly 1 includes a rigid outer shell or cup 2, and an elongated, flexible, resilient, tubular inflation 3 disposed within shell 2. As shown in FIG. 1, shell 2 surrounds and supports inflation 3, and inflation 3 is connected to a claw 4 (shown fragmentarily) which in turn is connected to an automatic milking machine (now shown). As is conventional, claw 4 is connected to a suitable constant vacuum system (not shown), and includes a plurality of nipples 5 (only one of which is shown in FIG. 1) to which inflation 3 is connected. Thus, inflation 3 is connected to a constant vacuum source via milking claw 4, as is conventional.

The shell 2 may be formed from a metal such as stainless steel, or another suitable rigid material such as synthetic thermoplastic or thermosetting resin. As shown best in FIG. 2, shell 2 is in the form of a hollow tubular body having an outer cylindrical wall 6 with an internal surface 7. The tubular body of shell 2 defines a longitudinal cylindrical passageway for receiving inflation 3, and thus defines a longitudinal axis 8. Shell 2 has an upper end including an axially extending rim 9 which, together with shoulder 10, defines an annular recess 11. Shell 2 also includes a lower end having a radially extending rim 12 defining an opening 13 of reduced diameter. A nipple 14 is integrally formed with outer wall 6 of shell 2, and extends at an acute angle with respect to axis 8. Nipple 14 is connected, via suitable tubing 15 (shown in phantom in FIG. 1), to communicate with a pulsator which alternates between subatmospheric pressure and atmospheric pressure to alternately cause the inflation 3 to contract and expand for milking, as is conventional.

The inflation 3 is a tubular member formed from a flexible, resilient elastomeric material, preferably a synthetic or natural rubber composition or a silicone composition. In the construction illustrated, inflation 3 is a one-piece molded unit, but for purposes of the present invention, it may also be constructed as a two-piece, three-piece or other multiple-piece unit. As illustrated, inflation 3 includes an elongated, generally cylindrical, hollow tubular barrel 16 disposed within the tubular body of shell 2, a head portion 17 dimensioned to fit within annular recess 11, and a milking tube section 18 extending from opening 13 in the lower end of shell 2. It should be noted that the terms "inflation" and "liner" are sometimes used interchangeably in the trade. However, as used herein, the term "liner" is intended to mean the barrel 16 which fits inside of shell 2 and receives a cow's teat. The term "inflation" is meant to encompass the entire one-piece unit illustrated, i.e. barrel 16, head portion 17 and milking tube section 18.

Head portion 17 is annular in shape, and forms a collar projecting radially outwardly from barrel 16. As shown best in FIG. 3, head portion 17 includes a mouth 19 for receiving a cow's teat. The diameter of mouth 19 is dimensioned to be slightly smaller than the diameter of barrel 16, as best shown in FIG. 3, so as to aid in holding teat cup assembly 1 on a teat 20 (shown in phantom lines in FIG. 3) of a cow. Head portion 17 forms a shoulder 21 which engages shoulder 10 of shell 2 so that inflation 3 may be properly installed and seated within shell 2. An upper seal between head portion 17 of inflation 3 and the upper end of shell 2 provides an air-tight seal. The upper seal is formed by an expandable ring 22, shown best in FIG. 3, disposed within head portion 17 and urging head portion 17 radially outwardly against axially extending rim 9 of shell 2.

Figure 4A:
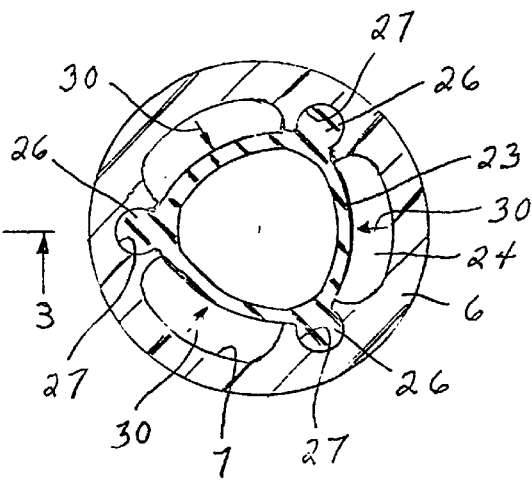
FIG. 4(a) is a cross-sectional view similar to FIG. 4 illustrating the barrel of the inflation in its collapsed massage profile below the body of a cow's teat.
Figure 4B:
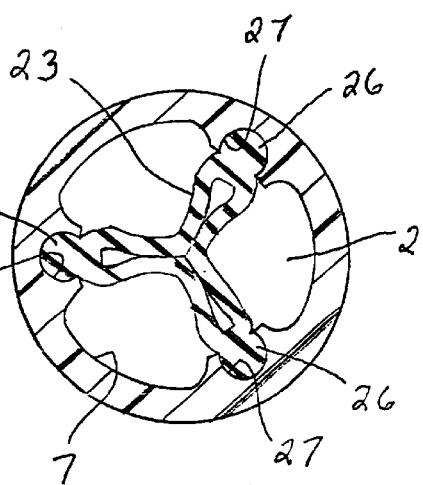
FIG. 4(b) is a cross-sectional view similar to FIG. 4(a) illustrating the barrel of the inflation in its collapsed massage profile below the tip of a cow's teat.

The barrel 16 of inflation 3 is disposed within the tubular body of shell 2. Barrel 16 is tubular in shape and defines a teat receiving region therein, and has an inner diameter in its relaxed state which is dimensioned have a diameter close to that of the outer diameter of teat 20. Barrel 16 includes a cylindrical outer wall having an exterior surface 23 spaced inwardly from internal surface 7 of shell 2 to define an annular vacuum chamber 24. Barrel 16 of inflation 3 is composed of a resilient elastomeric material and is movable between a relaxed profile, which is illustrated in FIG. 4, and a collapsed massage profile, which is illustrated in FIGS. 4(a) and 4(b). As previously described, these profiles occur because the interior of inflation 3 is subjected to a constant subatmospheric pressure while the vacuum chamber 24 is subjected to alternating pressure conditions resulting in periodic contracting and expanding of the barrel wall, which in turn results in a massaging action on teat 20.

Milking tube section 18 is integrally formed with barrel 16 and extends through opening 13 formed in the lower end of shell 2. Milking tube section 18 is conventional and includes a lower end which slips onto, or is forced over, claw nipple 5. A lower air-tight seal between milking tube section 18 and the lower end of shell 2 is formed by a radially extending, integral, annular, external flange 25 projecting from milking tube section 18 and abutting against radially extending rim 12. It will also be appreciated by those skilled in the art that various types of connection structure can be provided as a part of milking tube section 18 so as to afford a vacuum tight arrangement at the lower end of shell 2 as well as at claw 4.

During milking operations, the dynamics of individual milking inflations 3 may vary due to the tolerances of manufacturing processes as well as inherent differences in raw materials. In accordance with the invention, the present teat cup assembly 1 provides a manner of overriding such concerns so that a more consistent profile is obtained for inflation 3 whether in its relaxed profile or in its collapsed massage profile. In order to accomplish this, reinforcing means is provided for predetermining a desired relaxed and/or massage profile for barrel 16. This reinforcing means includes at least one elongated, axially extending mechanical interconnection or chemical bond between barrel 16 and shell 2. As illustrated, the reinforcing means is a mechanical interconnection, and comprises a plurality of elongated, circumferentially spaced, axially extending, integral external ribs 26 projecting from exterior surface 23 of barrel 16, together with a plurality of correspondingly elongated, circumferentially spaced, axially extending, mating internal grooves 27 formed in internal surface 7 of shell 2. As shown best in FIG. 2, ribs 26 extending axially almost the entire length of barrel 16 while grooves 27 extending axially the length of shell 2 between recess 11 and opening 13. As shown best in FIG. 4, ribs 26 have a circular cross-section and rib-receiving grooves 27 having corresponding circular cross-section dimensioned to be substantially the same as ribs 26. It should be noted that although ribs 26 and grooves 27 are illustrated as being circular in cross-section, other shapes such as corresponding triangular shapes may also be employed so long as the arrangement provides a slight undercut between the rib and the groove so that barrel 16 is held in place within shell 2. As noted, the reinforcing means may also be a molecular bond, or a chemical bond such as that formed by ultrasonically welding surface 23 to shell 2 or by adhesively attaching surface 23 to shell 2 in an axial configuration similar to ribs 26 and grooves 27.

In order to assemble inflation 3 within shell 2, the lower edges 28 of ribs 26 are aligned with the upper openings 29 of each groove 27. At the same time, milking tube section 18 is inserted through the interior of shell 2, until it extends through opening 13. Inflation 3 is then pushed or forced downwardly so that ribs 26 slide within grooves 27 until head portion 17 is seated within recess 11 and flange 25 passes through opening 13, as shown best in FIG. 3. Inflation 3, and particularly barrel 16, is thus held within shell 2. The combination of ribs 26 and grooves 27 reinforce barrel 16 so that as the pressure in chamber 24 periodically alternates between atmospheric and subatmospheric pressure, the outer wall of barrel 16 will deform, contract or collapse inwardly from the relaxed profile shown in FIG. 4 to the collapsed massage profile of FIG. 4(a) as indicated by arrows 30. Due to ribs 26 and grooves 27, barrel 16 will alternate between its relaxed profile and its collapsed massage profile identically and to the same extent each time the pressure in chamber 24 changes, no matter what frequency is employed.

Figure 5:
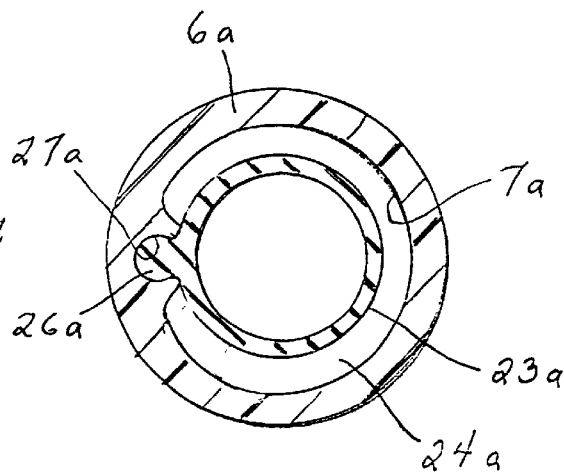
FIG. 5 is a cross-sectional view similar to FIG. 4 but of a second embodiment illustrating the inflation with only a single rib.
Figure 6:
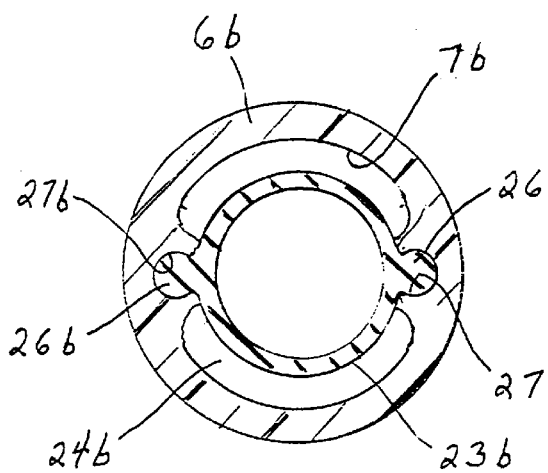
FIG. 6 is a cross-sectional view similar to FIG. 4 but of a third embodiment illustrating the inflation with two ribs.
Figure 7:
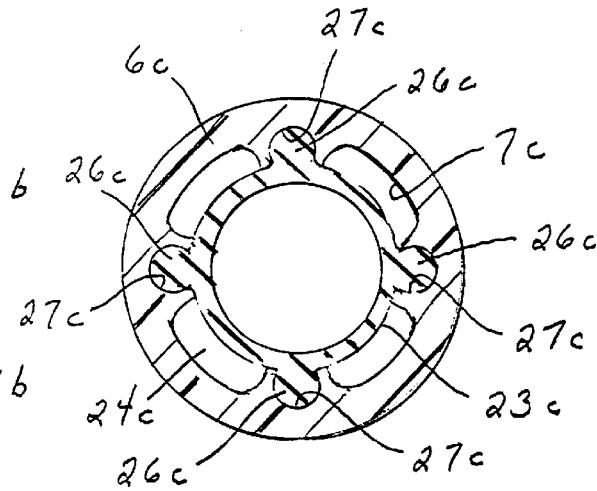
FIG. 7 is a cross-sectional view similar to FIG. 4 but of a fourth embodiment illustrating the inflation with four ribs.

As shown in FIGS. 4, 4(a) and 4(b), the preferred number of ribs 26 and grooves 27 is three, each disposed 120° from each other. This provides a triangular-shaped massage profile which is one of the most desired profiles as it massages almost the entire surface of teat 20. In particular, FIG. 4(b) illustrates the triangular configuration below the tip of teat 20 to intermittently relieve the tip of teat 20 from exposure to the constant vacuum applied to the interior of barrel 16. Nevertheless, other configurations may also be employed. For example, FIG. 5 illustrates a second embodiment of the present invention where like parts with respect to the first embodiment are designated with like numbers with the addition of the letter "a". Thus, FIG. 5 illustrates the use of a single rib 26a and groove 27a. FIG. 6 illustrates a third embodiment of the invention where like parts are designated with like numbers followed by the letter "b". Thus, FIG. 6 illustrates an assembly which utilizes two ribs 26b disposed 180° from each other, and two rib-receiving grooves 27b. Finally, FIG. 7 illustrates yet a fourth embodiment of the present invention where like parts are designated by like numbers followed by the letter "c". Thus, FIG. 7 illustrates an embodiment which includes four ribs 26c disposed 90° from each other, and four rib-receiving grooves 27c. The arrangement shown in FIG. 7 will thus provide a rectangular or square massage profile versus the triangular-shaped massage profile of FIG. 4(a).

What is claimed is:

1. A teat cup assembly for use with a milking machine for milking cows, comprising:
 a shell including a hollow tubular body having an outer wall and defining a longitudinal axis, said shell including an upper end and a lower end;
 an inflation including a hollow tubular barrel disposed within the tubular body of said shell, said barrel defining a teat-receiving region and having an outer wall spaced inwardly from the outer wall of said shell to define a vacuum chamber, said inflation deformable between a relaxed profile and a collapsed massage profile; and
 reinforcing means for predetermining a desired massage profile for the barrel of said inflation, said reinforcing means comprises a plurality of circumferentially spaced, elongated, axially extending interconnections between said barrel and said shell, said interconnections defining a plurality of vacuum chamber sections surrounding said barrel, each of said sections defined by the space between adjacent interconnections, each of said interconnections having a lower end axially spaced from the lower end of said shell so that said vacuum chamber sections communicate with each other to form a single vacuum chamber for alternately applying atmospheric pressure and subatmospheric pressure to said barrel to cause said inflation to alternately deform between said relaxed profile and said collapsed massage profile.

2. The teat cup assembly of claim 1 wherein said interconnections comprise ribs projecting from one of either said outer wall of said shell or said outer wall of said barrel and elongated, axially extending mating rib-receiving grooves formed in the other of either said outer wall of said shell or said outer wall of said barrel.

3. The teat cup assembly of claim 2 wherein said reinforcing means comprises a plurality of circumferentially spaced ribs projecting from said barrel and rib-receiving grooves formed in said shell.

4. The teat cup assembly of claim 3 wherein said reinforcing means comprises two ribs disposed 180° from each other, and two rib-receiving grooves.

5. The teat cup assembly of claim 3 wherein said reinforcing means comprises three ribs disposed 120° from each other, and three rib-receiving grooves.

6. The teat cup assembly of claim 3 wherein said reinforcing means comprises four ribs disposed 90° from each other, and four rib-receiving grooves.

7. The teat cup assembly of claim 2 wherein said rib and rib-receiving groove each have a circular cross section.

8. The teat cup assembly of claim 2 wherein said ribs are integral with said barrel and said grooves are formed integrally in the outer wall of said shell.

9. A teat cup assembly for use with a milking machine for milking cows, comprising:
 a shell including a hollow tubular body having an outer wall and defining a longitudinal axis, said tubular body further including an upper end having an axially extending rim defining an annular recess and a lower end having a radially extending rim defining an opening of reduced diameter;
 an inflation including a hollow tubular barrel disposed within the tubular body of said shell, said barrel defining a teat-receiving region and having an outer wall spaced inwardly from the outer wall of said shell to define a vacuum chamber, said inflation deformable between a relaxed profile and a collapsed massage profile, and a head portion dimensioned to fit within said annular recess and defining a mouth for receiving a cow's teat, and a milking tube section extending through the opening in the lower end of said shell;
 a plurality of elongated, circumferentially spaced, axially extending, integral external ribs projecting from the outer wall of said barrel; and a plurality of elongated, circumferentially spaced, axially extending, mating internal rib-receiving grooves formed in the outer wall of said shell; said ribs and grooves defining a plurality of vacuum chamber sections surrounding said barrel, each of said sections defined by the space between adjacent ribs and mating grooves, each of said ribs having a lower end axially spaced from the lower end of said shell so that said vacuum chamber sections communicate with each other to form a single vacuum chamber for alternately applying atmospheric pressure and subatmospheric pressure to said barrel to cause said inflation to alternately deform between said relaxed profile and said collapsed massage profile.

10. The teat cup assembly of claim 9 wherein there are two ribs disposed 180° from each other, and two rib-receiving grooves.

11. The teat cup assembly of claim 9 wherein there are three ribs disposed 120° from each other, and three rib-receiving grooves.

12. The teat cup assembly of claim 9 wherein there are four ribs disposed 90° from each other, and four rib-receiving grooves.

13. The teat cup assembly of claim 9 wherein said ribs and rib-receiving grooves each have a circular cross section.

14. The teat cup assembly of claim 9 further including an upper seal between the head portion of said inflation and the upper end of said tubular body.

15. The teat cup assembly of claim 14 wherein said inflation is composed of an elastomeric material, and further including an expandable ring disposed within said head portion and urging said head portion radially outwardly against said axially extending rim to form said upper seal.

16. The teat cup assembly of claim 9 further including a lower seal between the milking tube section of said inflation and the lower end of said shell.

17. The teat cup assembly of claim 16 wherein said inflation is composed of an elastomeric material, and further including a radially extending, integral, annular, external flange projecting from said milking tube section abutting against said radially extending rim to form said lower seal.

18. A teat cup assembly for use with a milking machine for milking cows, comprising:

a shell including a hollow tubular body having an outer wall and defining a longitudinal axis, said tubular body further including an upper end having an axially extending rim defining an annular recess and a lower end having a radially extending rim defining an opening of reduced diameter;

an inflation including a hollow tubular barrel disposed within the tubular body of said shell, said barrel defining a teat-receiving region and having an outer wall spaced inwardly from the outer wall of said shell to define a vacuum chamber, said inflation deformable between a relaxed profile and a collapsed massage profile, and a head portion dimensioned to fit within said annular recess and defining a mouth for receiving a cow's teat, and a milking tube section extending through the opening in the lower end of said shell;

three elongated, circumferentially spaced, axially extending, integral external ribs projecting from the outer wall of said barrel; and three elongated, circumferentially spaced, axially extending, mating internal rib-receiving grooves formed in the outer wall of said shell; said ribs and grooves defining three vacuum chamber sections surrounding said barrel, each of said sections defined by the space between adjacent ribs and mating grooves, each of said ribs having a lower end axially spaced from the lower end of said shell so that said vacuum chamber sections communicate with each other to form a single vacuum chamber for alternately applying atmospheric pressure and subatmospheric pressure to said barrel to cause said inflation to alternately deform between said relaxed profile and said collapsed massage profile.

19. The teat cup assembly of claim 18 wherein each rib and mating rib-receiving groove is disposed 120° from an adjacent rib and mating groove.

* * * * *